(No Model.)

C. A. WILLIAMS.
NUT LOCK.

No. 299,308. Patented May 27, 1884.

WITNESSES:
W. E. Bowen.
W. M. Rheem.

INVENTOR
Chas. A. Williams
BY
Myers & Co
ATTORNEYS.

UNITED STATES PATENT OFFICE.

CHARLES A. WILLIAMS, OF LAWSONHAM, PENNSYLVANIA.

NUT-LOCK.

SPECIFICATION forming part of Letters Patent No. 299,308, dated May 27, 1884.

Application filed February 25, 1884. (No model.)

*To all whom it may concern:*

Be it known that I, C. A. WILLIAMS, a citizen of the United States of America, residing at Lawsonham, in the county of Clarion and State of Pennsylvania, have invented certain new and useful Improvements in Nut-Locks, of which the following is a specification, reference being had therein to the accompanying drawings.

This invention pertains to improvements in nut-locks, having for its object to prevent nuts from jarring or working loose; and it consists of the combination of parts and their construction, substantially as hereinafter fully set forth, and pointed out in the claim.

Figure 1:
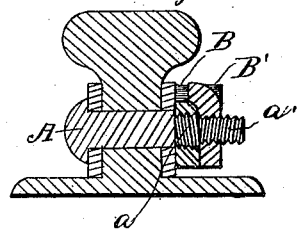
Figure 2:
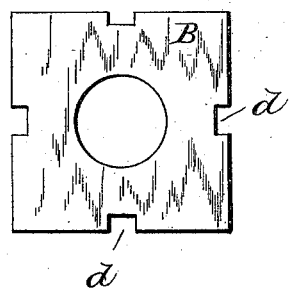
Figure 3:
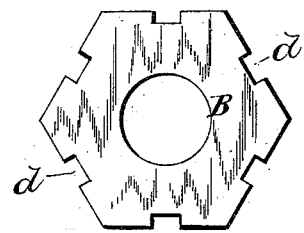
Figure 4:
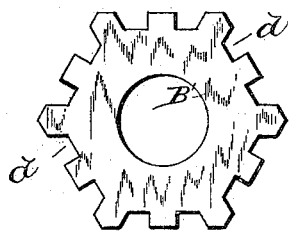
Figure 5:
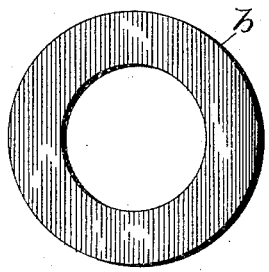

In the accompanying drawings, Figure 1 is a sectional view of my invention, showing it as applied in one among other ways in which it may be used. Figs. 2 to 5 are detail views of the same.

In carrying out my invention I employ in common with others a bolt, A, having a right-hand screw-thread, $a$, and a left-hand screw-thread, $a'$, with an offset between them, one threaded portion being of a greater diameter than the other. I next make use of two nuts, B B'—one, B, (which is for securing the bolt,) screwing upon the right-hand threaded portion, $a$, of the bolt A against a washer, $b$, when the said nut cannot be screwed home, and the other, B', (which is for locking the securing-nut,) screwing on the left-hand threaded portion, $a'$, as against being jarred loose, as, for instance, by the vibrations caused by a passing train, or from any other source.

To prevent the turning or jarring loose of the locking-nut B', I provide both it and the bolt-securing nut B with peripheral notches $d$, (said nuts being made polygonal or simply four-sided after the ordinary form of nut,) and bend any one or more of the tongues of the locking-nut, (the intention being to make it of annealed or other metal capable of being bent,) formed by notching said nut into the coincident notch or notches of the bolt-securing nut B, which will effect the firm locking of the parts as against accidental turning or becoming loose.

This invention is also applicable for use in various other connections, as in fastening braces and splice-bars of railroads, angle-irons of bridges, and buildings, and machinery.

Having thus fully described my invention, what I claim, and desire to secure by Letters Patent, is—

In a nut-lock, the combination, with the bolt, having the right and left hand screw-threads offset from each other, of the notched nuts, any one or more of the tongues of one of which nuts, formed by notching said nut, entering the coincident notch or notches of the other nut, substantially as and for the purpose set forth.

In testimony whereof I affix my signature in presence of two witnesses.

CHARLES A. WILLIAMS.

Witnesses:
  NEAL LAWSON,
  JAS. K. SHANNON.